United States Patent [19]
Whitley, Jr.

[11] 3,885,146
[45] May 20, 1975

[54] DETACHABLE TAIL LIGHT ASSEMBLY FOR BOAT TRAILERS

[76] Inventor: William P. Whitley, Jr., 4525 E. 10th Ln., Hialeah, Fla. 33013

[22] Filed: Feb. 22, 1974

[21] Appl. No.: 444,808

[52] U.S. Cl............... 240/7.1 R; 240/8.3; 240/90; 280/414 R
[51] Int. Cl............................................ B60g 1/26
[58] Field of Search............ 240/2 B, 7.1 R, 7.1 F, 240/8.3, 52 R, 57, 84, 90; 280/414 R; 340/87, 135

[56] References Cited
UNITED STATES PATENTS

| | | | |
|---|---|---|---|
| 2,797,310 | 6/1957 | Moore | 240/10 R X |
| 3,044,646 | 7/1962 | Sperow | 280/414 R |
| 3,083,292 | 3/1963 | Roe et al. | 240/8.3 |
| 3,632,138 | 1/1972 | Whiteley | 280/414 R |
| 3,788,502 | 1/1974 | Bell | 240/8.3 X |

FOREIGN PATENTS OR APPLICATIONS

| | | | |
|---|---|---|---|
| 1,806,228 | 4/1970 | Germany | 280/414 R |
| 1,122,389 | 1/1962 | Germany | 240/8.3 |
| 1,042,495 | 5/1957 | Germany | 240/90 |

Primary Examiner—Joseph F. Peters, Jr.
Assistant Examiner—Alan Mathews
Attorney, Agent, or Firm—Ernest H. Schmidt

[57] ABSTRACT

A detachable tail light assembly for boat trailers having tubular, vertically spaced, rear end boat guide posts is described. The assembly comprises left and right-hand stab bars receivable and frictionally retained within the upper ends of each of the guide posts and having pivotally attached thereto at their upper ends, outwardly-extending, elongated support bars, the outer ends of which support bars are interconnected by an elastic cable and carry respective left and right-hand tail light units. Electrical cables passing through the tubular guide posts and connectable between the tail light units and a supply conduit from the trailering vehicle serve to energize the tail light assembly upon installation.

7 Claims, 6 Drawing Figures

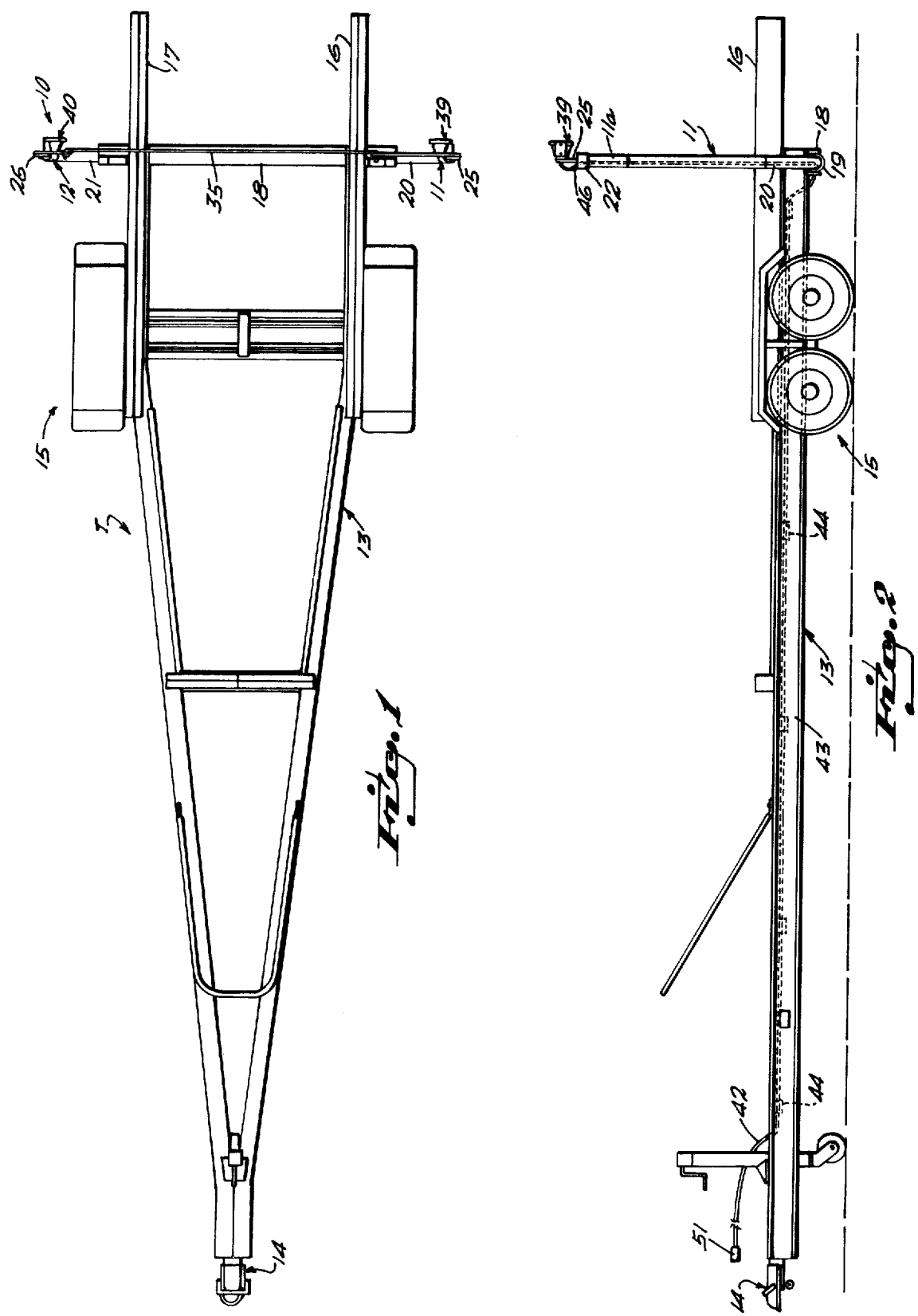

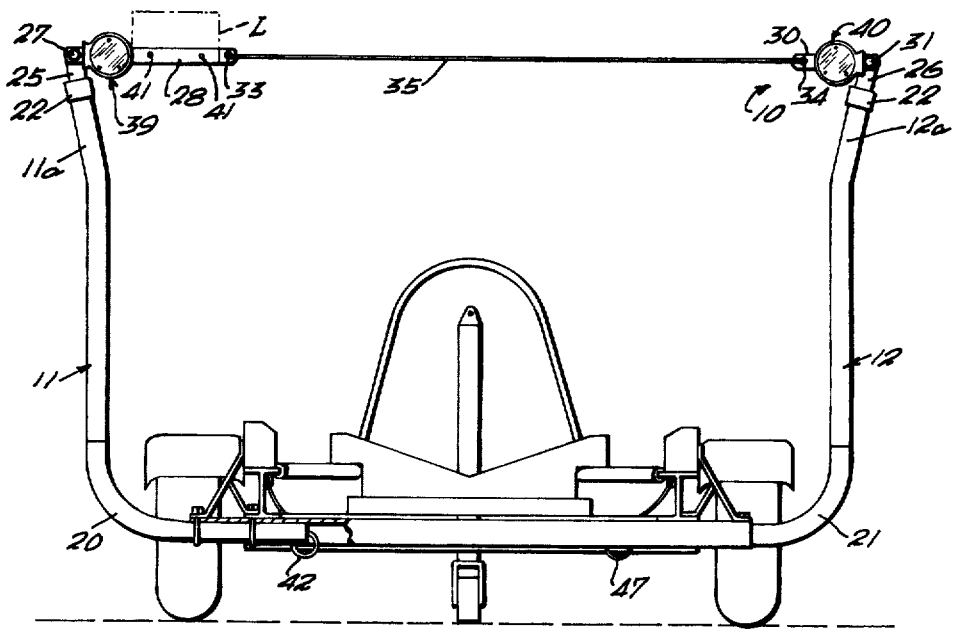
Fig. 3
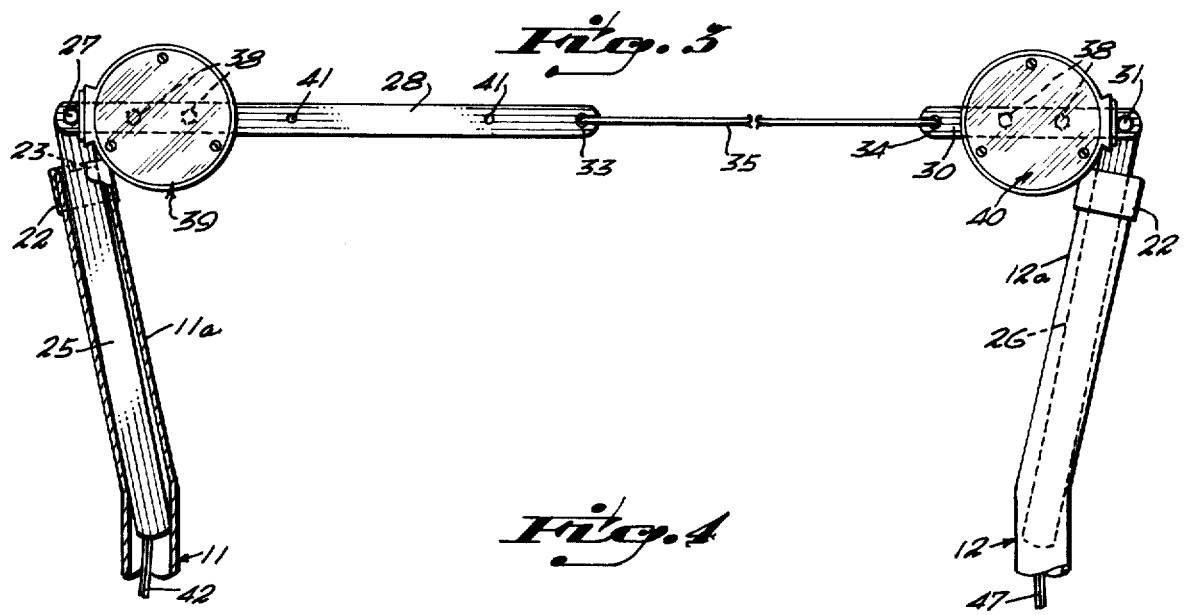
Fig. 4
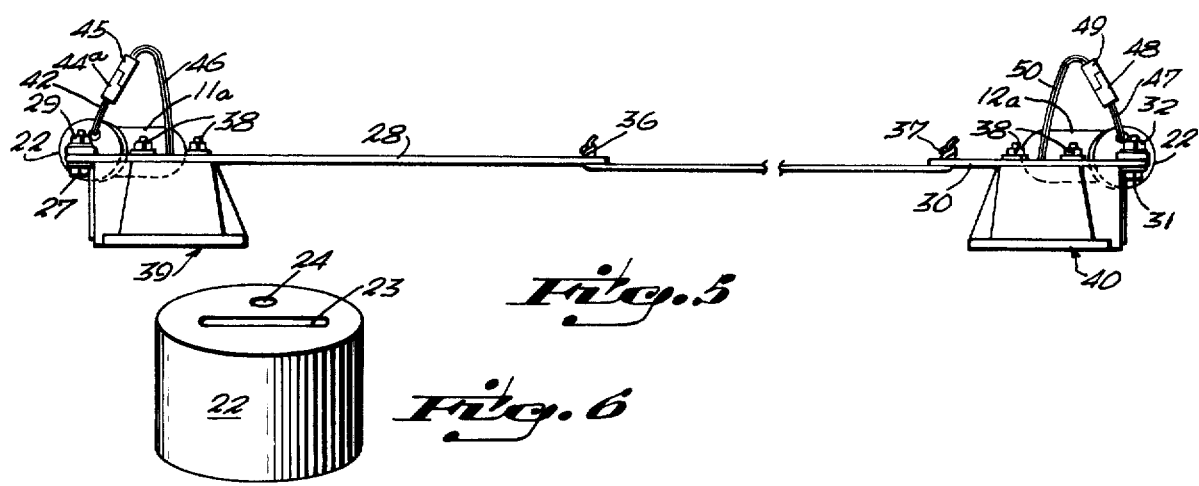
Fig. 5
Fig. 6

DETACHABLE TAIL LIGHT ASSEMBLY FOR BOAT TRAILERS

This invention relates to boat trailers and is directed particularly to a detachable tail light assembly securable between the upper ends of vertical guide post members forming part of the trailer at the rear end thereof and serving as guide means for properly positioning a boat upon the trailer when loading.

Heretofore, boat trailer parking lights, license plate lights, etc., have been installed more or less permanently at the rear end of the trailer framework, whereat they were vulnerable to accidental damage upon the loading and unloading of trailered boats. Such permanent installation of the electrical warning light system and license plate display even when boat trailers are not in use, during which periods of non-use they very frequently are left outdoors and exposed to the weather, subjected them to unnecessary deterioration and the possibility of pilferage. It is, accordingly, the principal object of this invention to provide a novel and improved detachable tail light assembly for boat trailers that obviates the above-described deficiencies of such lighting systems heretofore devised, while at the same time providing for an extremely simple and easy installation for use whenever a boat is to be trailered.

A more particular object of the invention is to provide a detachable tail light assembly of the character described comprising mounting means in the form of electrically conductive bars removably insertable within upper end portions of the opposed, vertically-extending tubular guide posts at each side of the rear end of a boat trailer, outer end portions of which friction bars support respective left and right hand signal lights and are inter-connected by resilient means operative to assist in frictionally securing the assemblage in place with respect to the guide posts.

Another object of the invention is to provide a detachable tail light assembly of the above nature which will be simple in construction, economical to manufacture, easy to install and remove, and long-wearing and effective in operation.

Other objects, features and advantages of the invention will be apparent from the following description when read with reference to the accompanying drawings. In the drawings, wherein like reference numerals denote corresponding parts throughout the several views:

FIG. 1 is a plan view a boat trailer equipped with a detachable tail light assembly embodying the invention;

FIG. 2 is a side elevational view of the boat trailer and light assembly illustrated in FIG. 1;

FIG. 3 is a rear elevational view thereof;

FIG. 4 is a rear elevational view of the detachable light assembly, on an enlarged scale, illustrating details of its attachment to partially illustrated upper end portions of the tubular trailer guide posts;

FIG. 5 is a top view of the assemblage illustrated in FIG. 4; and

FIG. 6 illustrates, in oblique view, one of the slotted end cap members which cap the upper ends of the tubular trailer guide posts.

Referring now in detail to the drawings, reference numeral 10 designates, generally, a detachable tail light assembly embodying the invention, the same being illustrated as attached in its position of use between the upper ends of opposed tubular guide posts 11 and 12 at the rear of a boat trailer T of the type, for example, illustrated and described in my U.S. Pat. No. 3,632,138, issued Jan. 4, 1972. The trailer T is comprised, generally, of a framework 13 of welded I-channel beams converging at the forward end to a hitch mechanism 14. The rear end of the boat trailer T is supported by a wheel assembly 15 and carries further rearwardly extending, spaced, parallel framework chock structures 16, 17. Welded or otherwise transversely secured to and between the undersides of the I-beam framework, and somewhat rearwardly of the wheel assembly 15, is a U-channel member 18, the open side of which faces downward. Secured within opposite end portions of the U-channel member 18 as by U-bolts 19 are substantially right-angular, tubular elbow members 20, 21, the outer ends of which are directed upwardly at each side of the trailer framework and wheel assembly whereat they join with respective upstanding tubular guide posts 11 and 12. As illustrated in FIGS. 3 and 4, short upper end portions of the tubular guide posts 11 and 12 are bent slightly outwardly to each side, as indicated at 11a and 12a, respectively. A cylindrical cap 22, preferably formed of a synthetic plastic material, is friction fitted over the upper end of each of the tubular guide posts 11, 12. As best illustrated in FIG. 6, the upper end wall of each of the caps 22 is provided with an elongated slot 23 and a circular opening 24, for the purposes hereinafter appearing.

As best illustrated in FIGS. 4 and 5, the detachable tail light assembly 10 comprises a pair of opposed stab bars 25, 26 of such size as to be readily insertable through the upper ends of and down into the short upper end portions 11a and 12a of the guide posts 11 and 12, respectively. As illustrated in FIG. 4, the stab bars 25, 26 fit through the elongated slots 23 of the respective associated cylindrical end caps 22, and are of such length as to extend sufficiently beyond the bends in the guide posts at the juncture between their vertical and outwardly-directed portions 11, 11a, and 12, 12a, respectively, to permit frictional jamming in place upon manual insertion of the stab bars. When so secured in place the upper ends of the stab bars will still project a short distance outwardly of their respective guide post end caps.

The left hand stab bar 25 has pivotally secured thereto, as by bolt 27, an elongated support bar 28. A friction nut 29 secures the bolt 27 in place as to permit frictional pivotal movement of the support bar 28 with respect to the stab bar 25. The opposite stab bar 26 similarly has a comparatively short support bar 30 secured at one end to the upper end thereof as by bolt 31 and friction nut 32. The outer ends of the support bars 28 and 30 are provided with through openings 33, 34, respectively, for attaching therebetween an elastic cord 35. As best illustrated in FIG. 6, the cord 35 is secured by inserting its ends through the respective support bar openings 33, 34 and fashioning knots 36, 37 thereat.

As illustrated in FIGS. 3, 4 and 5, inner end portions of the support 28 and 30 have secured thereto, as by bolts 38, left and right-hand tail light units 39, 40 respectively, which incorporate night running lights, brake warning lights and turn signal lights, in accordance with the usual vehicle lighting requirements. Since the structural details in wiring of such light assembly are well known, they are not further described herein. As illustrated in FIGS. 3 and 4, the left-hand support bar 28 is provided along its length with a pair of spaced through openings 41 for mounting a state license plate L as indicated by the broken-line representation thereof in FIG. 3.

In use, the detachable tail light assembly 10 will be installed as described above by inserting the stab bars 25, 26 down into the upper end portions 11a and 12a of the guide posts 11 and 12, whereat they will be frictionally retained in place. The elastic cord 35 is of such length as to impose a substantial tensional stress between the outer ends of the support bars 28, 30 upon installation of the device, whereby said support bars will automatically assume aligned horizontal positions between the guide posts 11 and 12. The substantial tensional force imparted by the elastic cord 35, together with the frictional linkage of the outer ends of the support bars 28, 30 with respect to their associated stab bars 25, 26, minimizes the possibility of displacement of said support bars and the associated tail light units even when travelling over rough roads.

As best illustrated in FIG. 2, an electrical cable 42 extends from the front or tongue end of the trailer T along the underside of one of the upper webs of one of the trailer framework I-beams 43, whereat it is secured in place as by clips 44. At the rear of the trailer, as illustrated in FIGS. 2 and 3, the electrical cable 42 loops under the U-channel member 18 and into the lower open end of the elbow member 21, whence it passes up through the tubular guide post 11, 11a and out of the circular opening 24 in the associated cap 22. At this end, the cable terminates in an electrical connector member 44a which is releasably connectable with a cooperative connector member 45 at the outer end of the wiring cable 46 of the tail light unit 39. The electrical cable 42 has spliced in parallel therewith at the underside of the U-channel member 18, a second member cable 47 (see FIGS. 3 and 5), which similarly is threaded up through the tubular guide post 12, 12a and terminates in an electrical connector member 48 releasably connectable with a cooperative electrical connector member 49 at the outer end of the wiring cable 50 associated with the right-hand tail light unit 40. Wiring is such that ground return is effected through the stab bars 25 and 26 and the trailer framework to the trailering vehicle electrical system ground. The tongue end of the electrical cable 42, as is illustrated in FIG. 2, terminates in an electrical plug member 51 which connects with the usual tail-light extension cable receptacle of the trailering vehicle.

A salient feature of the tail light assembly embodying the invention resides in the fact that, being completely detachable, it can be used selectively with any one of a plurality of similar boat trailers that may be put into use at any particular time to obviate the necessity of each trailer being provided with its own permanent lighting system.

Another important advantage is that, because the device must be removed from the trailer before a boat can either be loaded or unloaded, there is no possibility of damage occurring to the light assemblies during boat loading or unloading, as happens occasionally with trailers having fixed warning lighting systems.

While I have illustrated and described herein only one form in which my invention can conveniently be embodied in practice, this form is presented by way of example only and not in a limiting sense. The invention, in brief, comprises all the embodiments and modifications coming within the scope and spirit of the following claims.

What I claim as new and desire to secure by Letters Patent is:

1. In a detachable tail light assembly for boat trailers of the type comprising a trailer framework having chock means along its length for supporting a boat to be trailered thereon, a trailer hitch means at the front end of the framework for hitching to a transporting vehicle, an upstanding tubular guide post at each side of the trailer framework at the rear end thereof and serving as means for guiding a boat to be loaded for trailering, and an electrical energization cable running from the front to the rear of the trailer for interconnection with the electrical circuitry of a vehicle to which the trailer is attached for pulling, the combination comprising; a pair of electrical vehicle signal light units, means for removably securing one side of one of said signal light units to the upper end of one of said upstanding guide posts, means for removably securing one side of the other of said signal light units to the upper end of the other of said upstanding guide posts, and elastic means interconnecting the other sides of said signal light units for yieldingly urging said signal light units towards one another, said signal light units each comprising an electrical energization cable terminating in an electrical connector member adapted for electrical interconnection with the electrical energization cable of the trailer.

2. A detachable tail light assembly for boat trailers as defined in claim 1 wherein said means for removably securing one of said signal light units to the upper end of one of said guide posts comprises an elongated support bar, said one of said signal light units being secured near one end of said elongated support bar, said support bar comprising means for supporting a vehicular license plate.

3. A detachable tail light assembly for boat trailers as defined in claim 2, wherein said means for removably securing one side of the other of signal light units to the upper end of the other of said guide posts comprises a comparatively short elongated support bar, said other of said signal light units being affixed to said comparatively short elongated support bar, near one end thereof, said elastic interconnecting means comprising an elastic cord secured between the other ends of said support bars.

4. A detachable tail light assembly for boat trailers as defined in claim 3, wherein said means for removably securing said one side of each of said signal light units to the upper end of their respective upstanding guide posts comprises a stab bar pivotally secured at one end to said one end each of said elongated support bars and adapted to be slidingly received within upper end portions of the upstanding guide posts on each side of the trailer framework.

5. A detachable tail light assembly for boat trailers as defined in claim 4, wherein said trailer electrical energization cable comprises electrical cable members extending through said upstanding tubular guide posts.

6. A detachable tail light assembly for boat trailers as defined in claim 5, including a cylindrical cap received over the upper end of each of said tubular guide posts, each of said caps being formed with an elongated slot for the removable reception of its associated stab bar and a through opening for the passage of its respective electrical cable member.

7. A detachable tail light assembly for boat trailers as defined in claim 5, wherein each of said tubular upstanding guide posts is bent near its upper end to provide mutually divergent outer end portions defining obtuse angles, and wherein said stab bars are long enough to pass down into said acute angular portions of said guide posts whereby upon insertion, the lower end portions of said stab bars can be frictionally jammed in place.

* * * * *